United States Patent [19]

Föhl

[11] Patent Number: 4,907,820
[45] Date of Patent: Mar. 13, 1990

[54] BELT RETRACTOR

[75] Inventor: Artur Föhl, Schorndorf, Fed. Rep. of Germany

[73] Assignee: TRW Repa GmbH, Alfdorf, Fed. Rep. of Germany

[21] Appl. No.: 329,940

[22] Filed: Mar. 29, 1989

[30] Foreign Application Priority Data

Mar. 29, 1988 [DE] Fed. Rep. of Germany ....... 3810656

[51] Int. Cl.$^4$ .............................................. B60R 21/10
[52] U.S. Cl. .................................... 280/806; 280/807; 297/480
[58] Field of Search ................. 280/806, 807; 297/480

[56] References Cited

U.S. PATENT DOCUMENTS

| 4,422,594 | 12/1983 | Honl ..................................... 280/806 |
| 4,508,289 | 4/1985 | Singer et al. ......................... 280/806 |
| 4,618,108 | 10/1986 | Butenop et al. ...................... 280/806 |
| 4,726,540 | 2/1988 | Ches et al. ........................... 280/806 |
| 4,771,854 | 9/1988 | Syrowik ............................... 280/806 |

FOREIGN PATENT DOCUMENTS

| 2556400 | 6/1976 | Fed. Rep. of Germany . |
| 2826286 | 12/1979 | Fed. Rep. of Germany . |
| 3009701 | 9/1981 | Fed. Rep. of Germany . |
| 1118438 | 7/1968 | United Kingdom . |

Primary Examiner—Kenneth R. Rice
Attorney, Agent, or Firm—Tarolli, Sundheim & Covell

[57] ABSTRACT

The belt retractor is provided with a vehicle-sensitive and webbing-sensitive locking mechanism. At the two side faces of the belt coiling shaft in each case two locking pawls are pivotably mounted eccentrically thereto. They are each biased by a return spring into their rest position out of engagement with the teeth of a housing-fixed ratchet toothing member. The locking pawls are each mounted in their center of gravity. The webbing-sensitive locking takes place solely under the action of inertia forces.

21 Claims, 6 Drawing Sheets

BELT RETRACTOR

The present invention relates to a belt retractor for a motor vehicle safety belt restraining system comprising a vehicle-sensitive and webbing-sensitive locking mechanism having a housing-fixed ratchet toothing and a locking pawl which is pivotably mounted on a side face of the belt coiling shaft eccentrically to the latter and which is biased by a return spring into its rest position out of engagement with the ratchet toothing and is pivotal in vehicle-sensitive manner into locking engagement with the ratchet toothing by a cam on a cam disc which is rotatable relatively to the belt coiling shaft and is provided at its outer periphery with control teeth which cooperate with a control pawl drivable by a vehicle-sensitive sensor.

Belt retractors of this type are known in numerous constructions. The development of belt retractors has proceeded from simple locking mechanisms effecting direct engagement of the locking pawl by a pendulum or the like to complicated so-called indirectly engaging locking mechanisms sensitive both to the vehicle and to the webbing. These mechanisms fulfil the strict requirements of a low response threshold and reliable function by avoiding tooth rebound when tooth tips of the locking pawl and ratchet teeth strike each other. In such indirectly acting locking mechanisms a control disc is provided which via a cam brings an intermediate pawl into coupling engagement with the toothing of a pilot lever when it is turned relatively to the belt reel, thereby engaging the main locking pawl. This relative rotation arises in response to the vehicle in that the control disc in its rotational movement is stopped by a control pawl which is driven into the path of the control teeth on the outer periphery of the control disc by an inertia sensor. In response to the webbing this relative rotation arises in that the control disc is simultaneously constructed as inertia disc or is fixedly associated with an inertia disc so that on sudden acceleration of the belt coiling shaft it lags behind the latter.

Although such belt retractors fulfil most requirements and can also be economically made by mass production techniques, the present invention provides a further improvement in two respects: firstly, the rotational angle of the belt coiling shaft from the beginning of the activation of the locking operation until the start of the locking effect is substantially reduced, and secondly, this functional improvement is achieved with a simplified design reducing the production costs.

In the safety belt retractor of the present invention, at least one locking pawl is mounted in its center of gravity and the webbing-sensitive locking takes place solely under the action of inertia forces. The invention is based on the idea that for the webbing-sensitive locking a control disc is not necessary. With webbing-sensitive engagement of the locking pawl via the cam of the control disc the locking pawl as defined above depends inter alia on the angle of rotation of the relative rotation of the control disc with respect to the webbing coiling shaft required to execute the complete control stroke of the cam. A considerably shorter locking travel can be achieved with a construction of the belt retractor according to the invention in the case of webbing-sensitive locking because the pawl tends on sudden acceleration of the belt coiling shaft to remain in its position and by the rotation of the belt coiling shaft is consequently pivoted directly into locking engagement with the ratchet teeth. A further advantage is the simplification and saving in weight of the control disc which now need not be provided with an inertia body such as an inertia disc or the like for webbing-sensitive engagement. This advantage is particularly significant when the belt retractor is equipped with a tightening device which in a tightening operation subjects any control disc combined with an inertia disc to extremely high stresses. On combination of the belt retractor according to the invention with a tightening device another advantage is that after completion of the tightening operation an immediate engagement into the locking state occurs. Immediately after completion of a tightening operation a very high tension is built up in the belt system and tends to set the coiling shaft of the belt retractor in rotation in the belt withdrawal direction with high rotational acceleration. This return rotation of the belt coiling shaft must be prevented by the locking mechanism which must therefore respond extremely rapidly. This requirement is met by the locking mechanism constructed according to the invention because the locking pawl responds to the high rotational acceleration of the belt coiling shaft directly after completion of the tightening operation with an immediate engagement into the ratchet teeth.

In the webbing-sensitive engagement of the locking pawl in the ratchet teeth there is hardly any danger of the locking pawl rebounding when the tooth tips of locking pawl and ratchet teeth meet because the engagement thereof takes place before the belt coiling shaft has reached a high rotational speed. However, in order to ensure occurrence of a locking action even in case of such rebounding in accordance with an advantageous further development of the invention a second locking pawl is eccentrically pivotably mounted on the axial end of the belt coiling shaft and is offset with respect to the first locking pawl in the peripheral direction by an angle which corresponds to a fraction of the pitch of the housing-fixed ratchet toothing. Thus, when the one locking pawl with its tooth tip strikes a tooth tip of the ratchet teeth the tooth tip of the other locking pawl is certain to engage into a tooth gap. Any tooth rebound thus has no detrimental effect whatever.

It is particularly advantageous for both locking pawls to be identically made, preferably in plan view in the form of a parallelogram having an acute corner forming the tip of a locking tooth and for the two locking pawls to be arranged approximately diametrically opposite each other. This makes optimum use of the available space because locking pawls which can be highly stressed mechanically can be accommodated in an approximately cylindrical volume having a height corresponding to the width of a ring carrying the ratchet teeth. Whereas under low load the locking action is generated by only one locking pawl under extremely high accident stress at which a certain deformation of the ratchet teeth and locking pawls occurs the loads can be taken up approximately uniformly by the two locking pawls if the magnitude of the offsetting of the locking pawls with respect to each other in the peripheral direction is made small enough.

Further advantageous embodiments of the invention are set forth in the subsidiary claims.

Further features and advantages of the invention will be apparent from the following description of a preferred embodiment and from the drawings to which reference is made and wherein.

Figure 1:
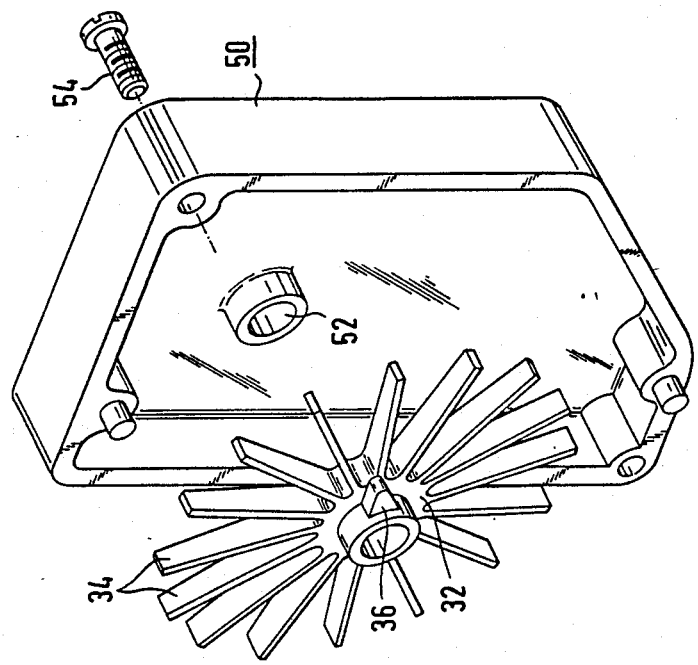
FIG. 1 shows a perspective schematic view of a belt retractor in separated illustration.
Figure 1:
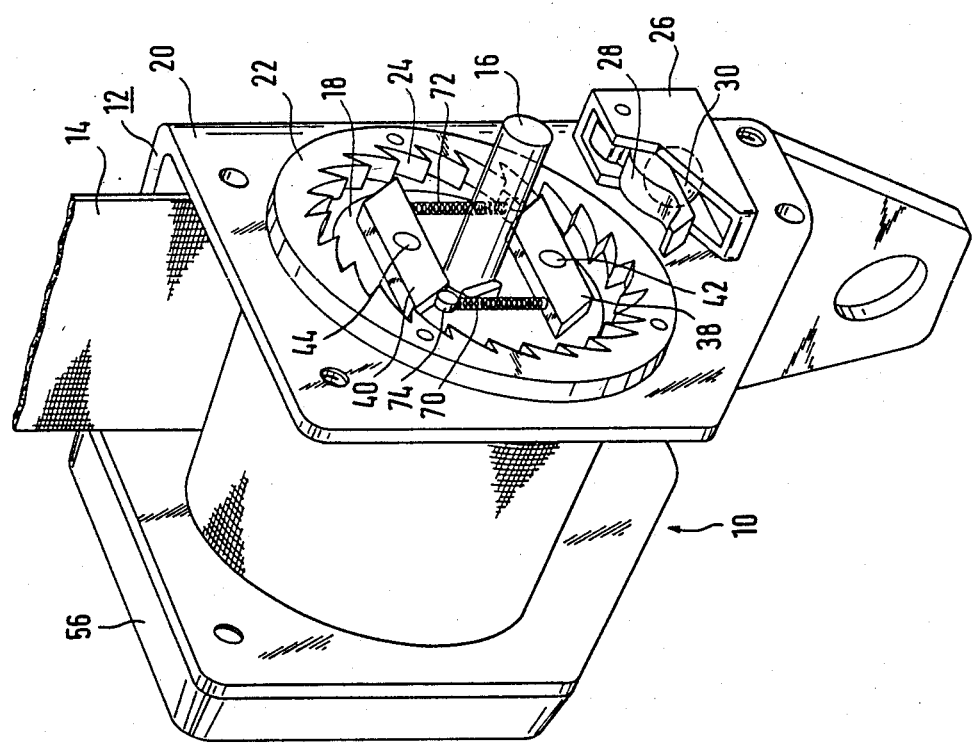

In FIG. 1 a belt retractor is shown from the side of the locking mechanism with the housing cap removed and separated. The belt retractor denoted generally by 10 comprises a housing 12 in the form of a U-shaped frame in the side plates of which a belt coiling shaft 18 is rotatably mounted, on which the webbing 14 is wound. The belt coiling shaft comprises a shaft extension 16 which projects from one side face of the belt coiling shaft 18 out of the housing 12. Mounted on the side plate 20 of the housing 12 is a ring member 22 which is provided with an inner toothing which forms the ratchet teeth 24 fixed with respect to the housing. Furthermore, at the side plate 20 of the housing 12 an open bearing housing 26 for a control pawl 28 mounted pivotably therein is secured. The control pawl 28 lies on a metal ball 30 which is retained in the bearing housing 26 and forms an inertia sensor.

Rotatably mounted on the shaft extension 16 is a control disc 32. Said control disc 32 consists of a bearing hub from which control teeth 34 project in star manner and a cam 36 formed on the bearing hub. At the side faces of a belt coiling shaft 18 two locking pawls 38, 40, approximately parallelogram-shaped in plan view, are pivotably mounted by securing to an end 42 and 44 respectively of a shaft (FIG. 6) rotatably mounted in the belt coiling shaft.

The housing cap 50 shown removed in FIG. 1 is provided at its inner side with a bearing bush 52 in which the end of the shaft extension 16 is mounted for easy-running. The housing cap 50 is secured by means of screws 54 to the side plate 20 of the housing 12. An assembly 56 accommodating in usual manner a takeup spring of the belt retractor is secured in similar manner to the other side plate of the housing 12.

Figure 6:
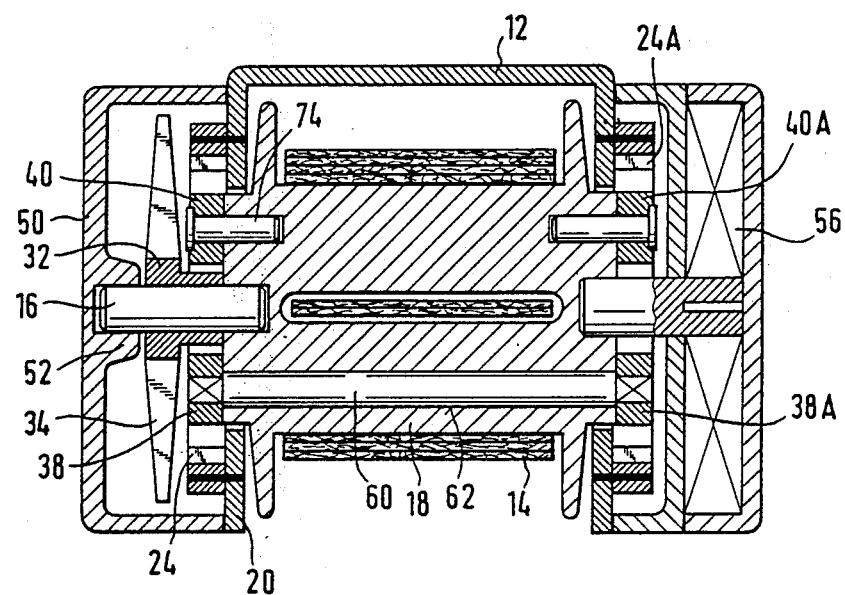
FIG. 6 is a longitudinal section of the belt retractor shown in FIG. 1.

It is apparent from the longitudinal section shown in FIG. 6 that the locking mechanism of the belt retractor is made symmetrical. In addition to the ratchet teeth 24 and the locking pawls 38, 40 on one side of the belt coiling shaft 18, corresponding ratchet teeth and two locking pawls 38A, 40A are provided on the other side. The locking paws 38 and 38A are rigidly connected together by a rod 60 which is rotatably mounted in an axial bore 62 of the belt coiling shaft 18. The locking pawls 38, 38A are mounted in form-locking manner on the ends of the rod 60 and secured thereon for example by calking. In analogous manner the two locking pawls 40, 40A are rigidly connected together by a shaft. The ratchet teeth 24, 24A and the locking pawls 38 and 38A as well as 40 and 40A are arranged in respective alignment.

Particular features of the locking mechanism in the belt retractor according to the invention will now be explained with reference to FIGS. 2 to 5.

Each of the locking pawls 38, 38A and 40, 40A is mounted in its centre of gravity. Each of said locking pawls is parallelogram-shaped in plan view and comprises a locking tooth Z formed by an acute corner of the parallelogram. A pressure spring 70 and 72 respectively bears with its one end on each locking pawl 38, 40 on the side remote from the ratchet teeth 24 and the other end of said spring bears on an abutment 74 and 76 respectively which is mounted in the side of the belt coiling shaft 18 and serves simultaneously as stop for the adjacent locking pawl 40 and 38. The pressure springs 70, 72 hold the locking pawls 38, 40 resiliently in their rest position defined by the abutments 74, 76 out of engagement with the ratchet teeth 24.

Figure 2:
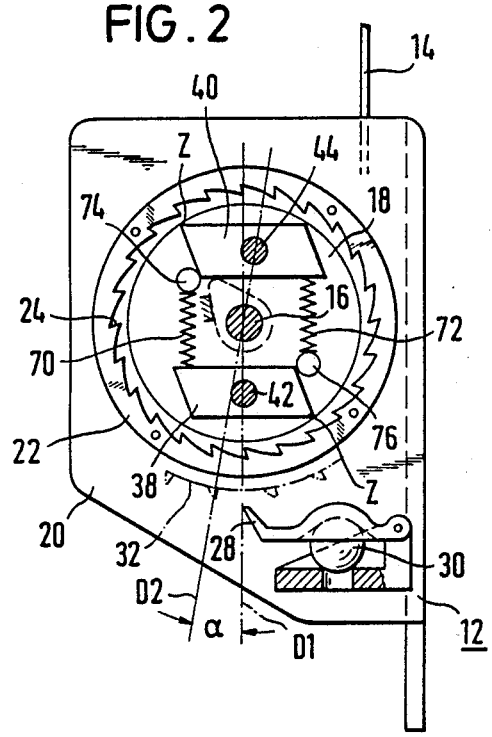
FIGS. 2 to 5 show schematic side views of the belt retractor illustrating the function of the locking mechanism in various function states.

FIG. 2 shows the locking pawls 38, 40 in the rest state. The opposite corresponding locking pawls 38A, 40A are in a analogous rest position.

The locking pawls 38, 40 (and 38A, 40A) lie only approximately diametrically opposite each other. In FIG. 2 two diametral lines D1 and D2 are indicated, of which the line D1 extends through the axis of the shaft extension 16 and through the axis of the bearing pin 42 whilst the line D2 extends through the axis of the shaft extension 16 and the axis of the bearing pin 44. The two diametral lines D1 and D2 are offset with respect to each other by an angle corresponding to a fraction of the pitch of the ratchet teeth 24. The teeth tips Z of the locking pawls 38, 40 (and 38A, 40A) are thus offset with respect to each other in the peripheral direction of the belt coiling shaft 18 by an angle corresponding to a fraction of the pitch of the ratchet teeth 24.

Figure 3:
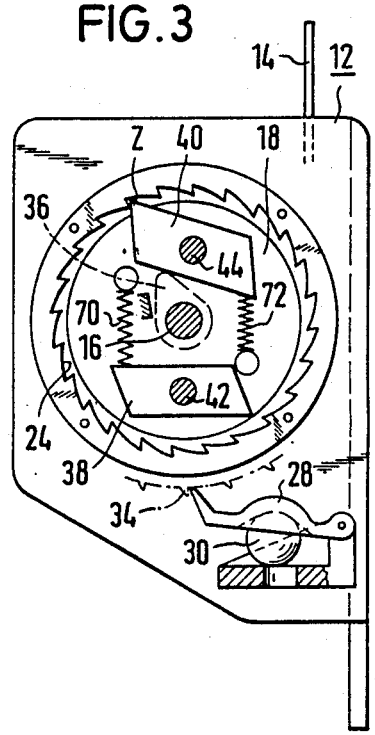

FIG. 3 shows the vehicle-sensitive locking by moving the locking pawl 40 into locking engagement with the ratchet teeth 24. The cam 36 of the control disc 32, which is only indicated in FIGS. 2 to 5, is turned with the control disc a few degrees compared with the belt coiling shaft 18 because the control disc 32 has its rotational movement stopped by the control pawl 28 raised over the ball 30 and dropping down in front of a control tooth 34. By the relative rotation between the belt coiling shaft 18 and the control disc 32 the cam 36 moves away from the stop defining its rest position and presses the locking pawl 40 radially outwardly so that it is pivoted and with its locking tooth Z driven into a tooth gap of the ratchet teeth 24. The locking pawl 38 remains in its rest position.

Figure 4:
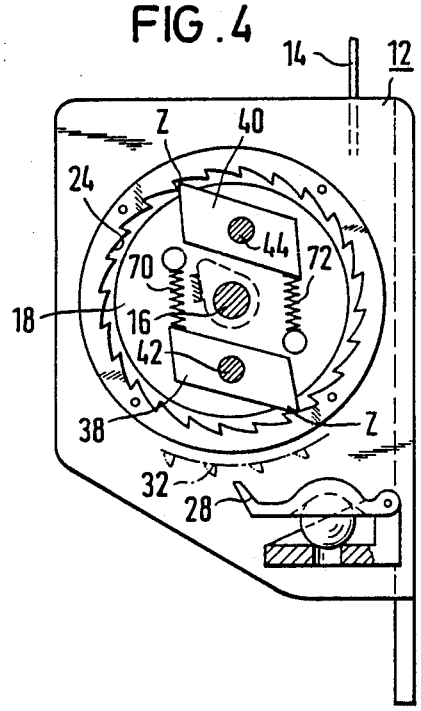

FIG. 4 shows the webbing-sensitive engagement of the locking pawl 40 into the ratchet teeth 24. The pivoting of the locking pawl 40 necessary for this takes place solely under the action of its inertia because it is mounted in its centre of gravity. On sudden rotational acceleration of the belt coiling shaft 18 the locking pawl 40 tends to retain its position in space so that on further rotation of the belt coiling shaft 18 it is pivoted in the desired direction. The locking pawl 38 is also pivoted in the same manner. The locking pawl 40 however drops with its two tip Z into the bottom of a tooth gap between two successive teeth of the ratchet toothing 24 whilst the locking pawl 38 comes to bear with its tooth tip Z substantially in the centre between two adjacent teeth of the ratchet toothing 24.

Figure 5:
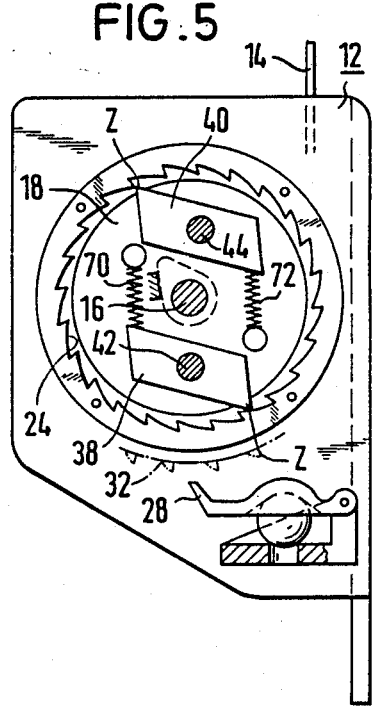

In the function state shown in FIG. 5 the tooth tip Z of the locking pawl 40 exactly meets a tip of the ratchet teeth 24. Any rebounding of the locking pawl 40 cannot however jeopardise the immediate establishment of the locking action because at the same time the locking pawl 38 with its tooth tip Z moves into a tooth gap between two adjacent teeth of the ratchet toothing 24 and on subsequent relative rotation between the belt coiling shaft 18 and ratchet teeth 24 through only a few degrees the locking pawl 38 drops into locking engagement with the ratchet teeth 24.

In the embodiment described the locking pawls 38, 40 and 38A, 40A are movable independently of each other. According to a further development not illustrated in the drawings the movements of the locking pawls are synchronized with each other by suitable connecting means.

The magnitude of the offsetting of the two locking pawls 38, 40 and 38A, 40A in the peripheral direction with respect to each other is determined in accordance with the tooth geometry in such a manner that on the one hand should two teeth tips strike each other the tooth tip of the respective other locking pawl is certain not to strike a tooth tip as well and on the other hand on rebounding of the one pawl the angle of rotation before the other locking pawl engages into a tooth gap is as small as possible. Under extremely high load of the locking mechanism, the blocking load is then taken up by both the locking pawls because a certain plastic deformation of the functional parts of the locking mechanism takes place.

Figure 7:
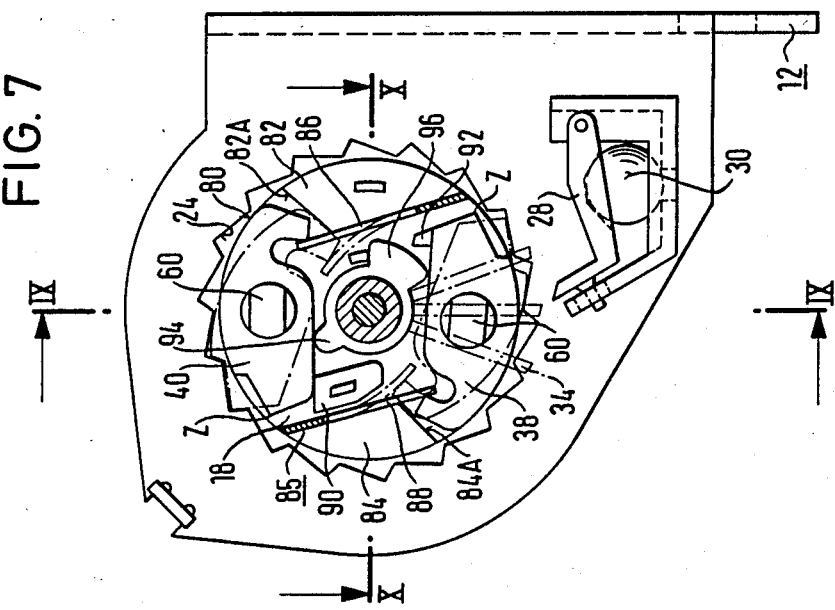
FIG. 7 is a side elevation of another embodiment of the belt retractor in the rest state.
Figure 8:
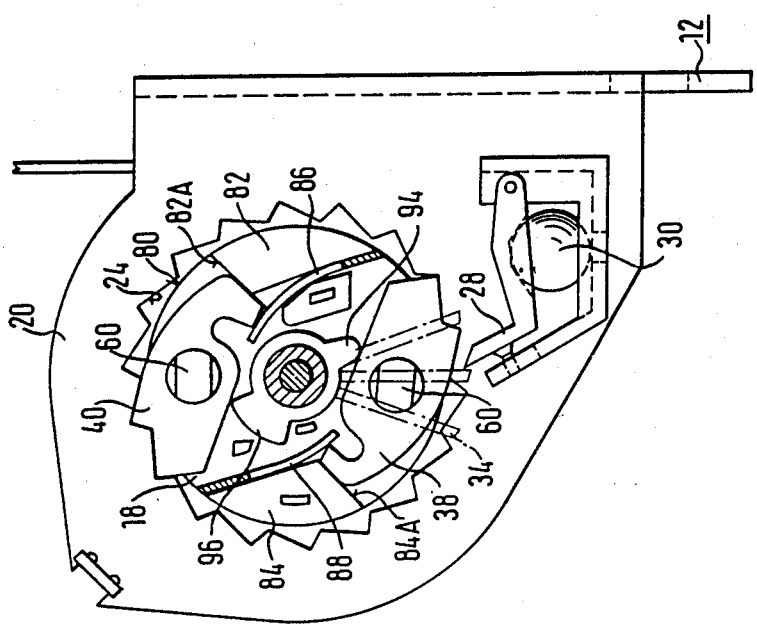
FIG. 8 is a side elevation analogous to FIG. 7 but for the activated state.

In the embodiment shown in FIGS. 7 to 10 two pairs of locking pawls 38, 38A and 40, 40A are provided. Said locking pawls are each mounted in their centre of gravity and have a circular outer periphery which is incorporated into the circular outer contour 80 of the belt coiling shaft 18. Each locking pawl 38, 38A, 40, 40A is arranged in a free space which is formed between two axial extensions 82, 84, approximately segment-shaped in plan view, of the belt coiling shaft 18. The outer periphery of the axial extensions 82, 84 is incorporated into the circular outer contour 80 of the belt coiling shaft 18. The axial extensions 82, 84 are so dimensioned that they project outwardly in each case beyond the housing-fixed ratchet teeth 24. FIG. 7 shows the locking pawls 38, 40 in their rest position into which they are urged by a leaf spring 86 or 88 respectively which is bent off from a spring sheet portion 85 and which is anchored to the adjacent axial extension 82 or 84 respectively. FIG. 8 shows the locking pawls 38, 40 in their activated state deflected in the direction of the ratchet teeth 24. The rest position of the locking pawls 38, 40 is defined by further axial extension 90, 92 of the belt coiling shaft 18 at which the adjacent locking pawl 40 and 38 respectively is held resiliently in engagement. The control disc 32 carries at a hub two approximately diametrically oppositely disposed control cams 94, 96, the first of which actuates the locking pawl 40 and the second of which actuates the locking pawl 38 in a vehicle-sensitive manner when the control pawl 28 drops into the control teeth 34 of the control disc 32. The locking pawls 38, 38A and 40, 40A are rigidly connected together in pairs by a rod 60 which is mounted in a bearing bore 62 of the belt coiling shaft 18. A bearing bushing 100 of resiliently yieldable material is inserted into each of the axial ends of each bearing bore 62. The yieldability of the mounting of each rod 60 is so designed that under locking load both locking pawl pairs engage in locking manner into a tooth gap of the housing-fixed ratchet teeth 24 although the engagement faces Z of the locking pawls 38, 38A are offset with respect to the engagement faces Z of the locking pawls 40, 40A in the peripheral direction by about a fraction of the pitch of the ratchet teeth 24. Although in a locking operation firstly only two locking pawls 38, 38A or 40, 40A are driven lockingly into the ratchet teeth 24, on subsequent increasing of the locking load the bearing bushings 100 are deformed in the peripheral direction so that the respective other locking pawl pair also conducts the locking load into the housing-fixed ratchet teeth 24 (FIG. 8). A further peculiarity of this embodiment resides in that under high locking load the locking pawls bear with their back face remote from the respective engagement face on the adjacent shoulder 82A or 84A of the axial extension 82 or 84 respectively. Due to this bearing of the locking pawls under high locking load on the axial extensions 82, 84 of the belt coiling shaft the mounting of the locking pawl pairs is relieved and in particular protected from extreme loading so that the locking pawls even after a high accident load are still mounted freely movably enough to be moved by the associated return spring 86 or 88 back to the rest position.

Figure 9:
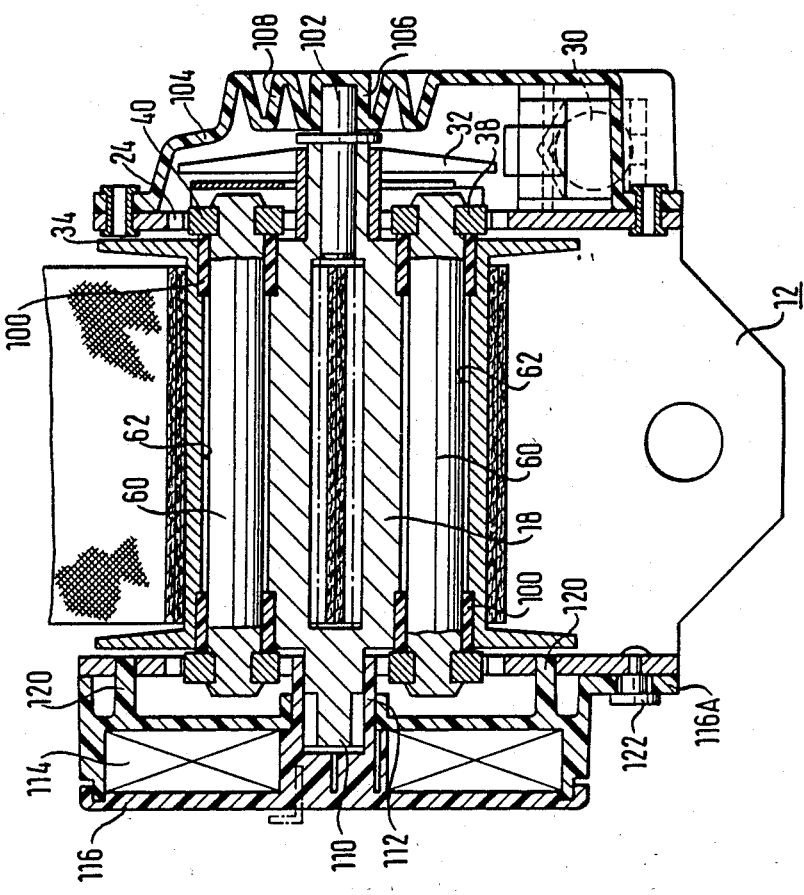
FIG. 9 is an axial section along the line IX—IX of FIG. 7.
Figure 10:
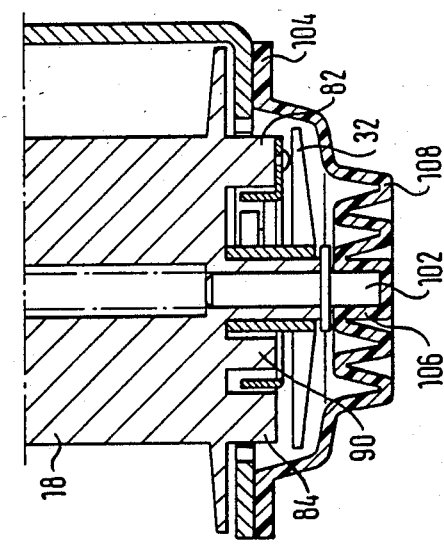
FIG. 10 is an axial partial section along the line X—X of FIG. 7.

A further peculiarity of the embodiment described is shown in FIGS. 9 and 10. It relates to the mounting of the belt coiling shaft 18. On the side of the control disc 32 the belt coiling shaft 18 is provided at its axial end with a bearing pin 102 which is mounted for free rotation in a bearing bushing 106 integrally formed in a housing cover 104. The bearing bushing 106 is surrounded by a double concentric bead 108 which is likewise integrally formed in the housing cover 104 and by which the bearing bushing 106 is held yieldably in the radial direction.

On the opposite side the belt coiling shaft 18 is mounted by means of a bearing extension 110 in a bearing bushing 112 which is held by a housing cover 116 which surrounds the retractor spring 114, is displaceable in radial direction and is resiliently mounted on the adjacent side wall of the housing 20. The housing cover 116 comprises at its side facing the housing 20 integrally formed resilient deflectable pins 120 which are each inserted with their free end in an associated bore of the side wall of the housing 20. Furthermore, the housing cover 116 is provided at its outer periphery with a flange-like extension 116A in which radially directed slots are formed through which collar pins 112 anchored in the side plate of the housing 20 engage to mount the housing cover 116 displaceably in the radial direction on the side wall of the housing 20. The belt coiling shaft 18 is thus equipped with an easy-running fine mounting which resiliently yields under load so that the belt coiling shaft 18 with its axial extensions 82, 84 and with the locking pawls 38, 38A and 40, 40A bears on the housing-fixed ratchet teeth 24 which then act as coarse bearing. This state, in which the locking pawl pairs introduce the locking load into the ratchet teeth 24 and the belt coiling shaft 18 bears with its outer periphery on the housing-fixed ratchet teeth 24, is illustrated in FIG. 8.

Figure 11:
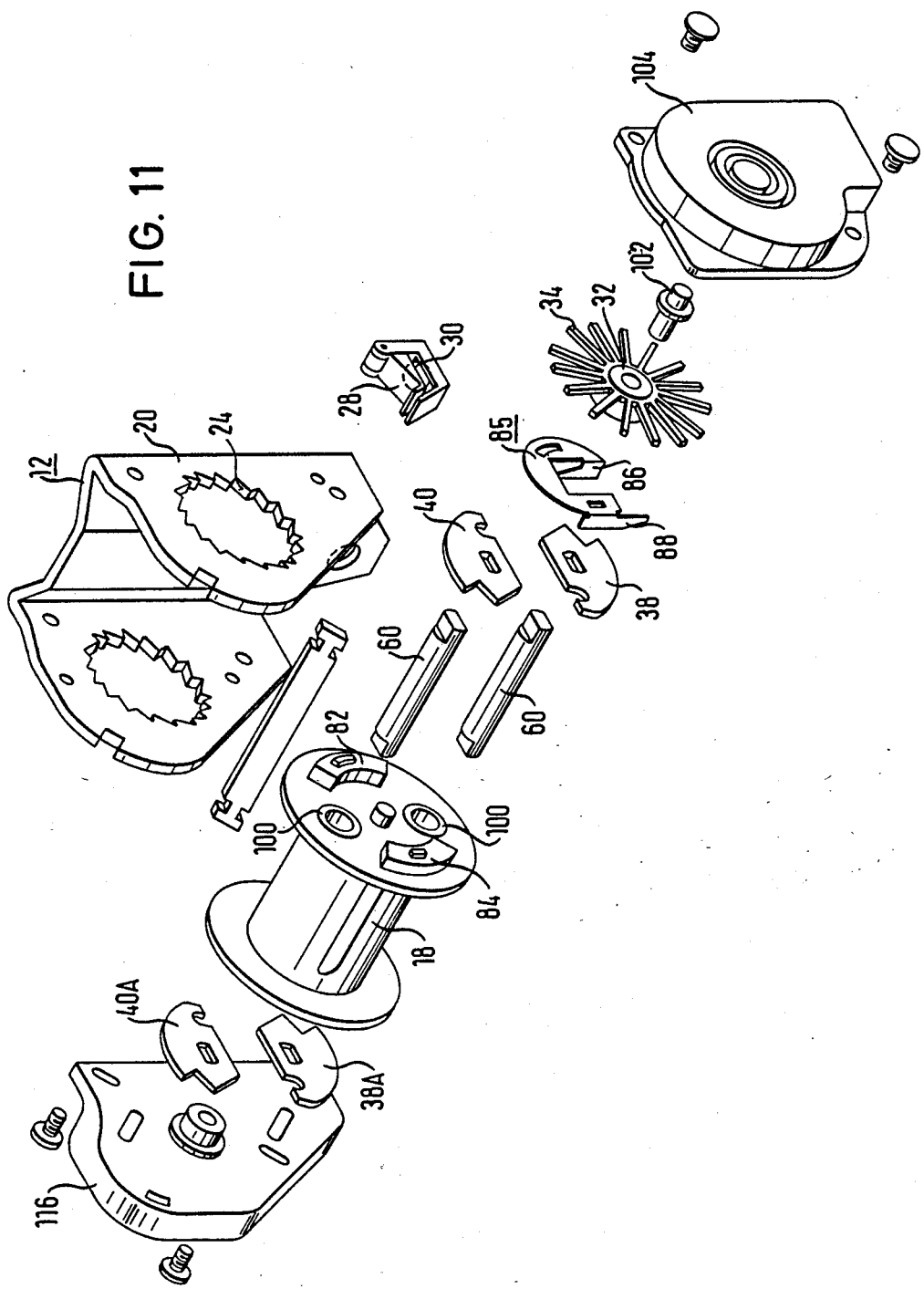
FIG. 11 is an exposed perspective view of the embodiment shown in FIGS. 7 to 10.

As apparent from FIG. 11 the various components of the safety belt retractor are mounted in a housing 20 with drawnin bottom plate and angled side walls which permit a radial insertion in the belt coiling shaft with components premounted thereon and are subsequently uprighted and made parallel by straightening the bottom plate of the housing.

I claim:

1. A belt retractor for a motor vehicle safety belt restraining system comprising a housing, a belt coiling shaft rotatably mounted in said housing and a vehicle-sensitive and webbing-sensitive locking mechanism, said locking mechanism having a ratchet toothing member fixed to said housing and a pair of locking pawls pivotably and eccentrically mounted on a side face of said belt coiling shaft and which are biased by a return spring into a rest position out of engagement with the teeth of said ratched toothing member and are mounted for pivotal vehicle-sensitive movement into locking engagement with the teeth of said ratchet toothing member under the action of a cam member which is rotatable relatively to said belt coiling shaft and is provided at its outer periphery with control teeth which cooperate with a control pawl drivable by a vehicle-sensitive sensor, each of said locking pawls being mounted in its center of gravity and the webbing-sensitive locking taking place solely under the action of inertia forces occurring upon sudden acceleration of said belt coiling shaft, and said locking pawls having engagement faces which are offset with respect to each other in the peripheral direction of said belt coiling shaft by an angle which corresponds to a fraction of the pitch of the teeth of said ratchet toothing member.

2. The belt retractor according to claim 1, wherein each of said locking pawls is parallelogram-shaped with an acute corner forming the tip of a locking tooth.

3. The belt retractor according to claim 2, wherein said locking pawls are arranged approximately diametrically opposite each other.

4. The belt retractor according to claim 2, wherein said locking pawls are of substantially identical shape.

5. The belt retractor according to claim 2, wherein each locking pawl is biased into a rest position by a pressure spring which bears with one of its ends on the associated locking pawl and with the other of its ends on an abutment which is secured to the corresponding side of said belt coiling shaft and acts at the same time as a stop for the adjacent locking pawl for defining its rest position out of engagement with the teeth of said ratchet toothing member.

6. The belt retractor according to claim 2, wherein one of said locking pawls is both vehicle and webbing-sensitive and the other of said locking pawls is webbing-sensitive only and is adapted to be brought into engagement with the teeth of said ratchet toothing member solely under the action of its inertia.

7. The belt retractor according to claim 2, wherein the two locking pawls are biased into their rest positions by return springs of different strength.

8. The belt retractor according to claim 1, wherein said locking mechanism comprises a pair of locking pawls on either side of said belt coiling shaft, each pair of locking pawls having an associated ratchet toothing member, and each locking pawl being on the one side of said belt coiling shaft being connected to a corresponding locking pawl on the other side of said belt coiling shaft by a rod which is rotatably mounted in an axial bore of the belt coiling shaft.

9. The belt retractor according to claim 1, wherein each of said pairs of locking pawls are mounted on said belt coiling shaft in a manner to yield under a substantial locking load to an extent ensuring transmission of locking load from each of said pairs of locking pawls to said associated ratchet toothing member in spite of the engagement faces of said locking pawls being shifted with respect to each other in the peripheral direction of said belt coiling shaft by an angle corresponding to a fraction of the pitch of said ratchet toothing member.

10. A belt retractor for a motor vehicle safety belt restraining system comprising a housing, a belt coiling shaft rotatably mounted in said housing, and a vehicle-sensitive and webbing-sensitive locking mechanism, said locking mechanism having a ratchet toothing member fixed to said housing and a pair of locking pawls pivotably and eccentrically mounted on each side face of said belt coiling shaft, each locking pawl being biased by a return spring into a rest position out of engagement with the teeth of said ratchet toothing member and being mounted for pivotal movement into locking engagement with the teeth of said ratchet toothing member, each locking pawl on one side of said belt coiling shaft being rigidly interconnected with a corresponding locking pawl on the other side of said belt coiling shaft by means of a rod rotatably supported in an axial bore of said belt coiling shaft, a cam wheel being mounted rotatably with respect to said belt coiling shaft and provided at its outer periphery with control teeth which cooperate with a pilot lever drivable by a vehicle-sensitive sensor, each of said locking pawls being mounted in its center of gravity so that a webbing-sensitive locking takes place solely under the action of inertia forces occurring upon sudden acceleration of said belt coiling shaft, and said control wheel being provided with cam means for engagement of at least one pair of said locking pawls for vehicle-sensitive movement of said locking pawls into engagement with said ratchet toothing member upon relative rotary movement between said control wheel and said belt coiling shaft, and said locking pawls of each pair having engagement faces which are offset with respect to each other in the peripheral direction of said belt coiling shaft by an angle which corresponds to a fraction of the pitch of the teeth of said ratchet toothing member.

11. The belt retractor according to claim 10, wherein said rod is resiliently supported in said axial bore to yield in the peripheral direction under a substantial locking load transmitted by said locking pawls.

12. The belt retractor according to claim 11, wherein said rod is mounted in at least one sleeve member inserted into said axial bore and made of a resilient material.

13. The belt retractor according to claim 10, wherein each locking pawl is mounted in an accommodation space defined on the corresponding side of said belt coiling shaft between axial projections of said belt coiling shaft, said axial projections projecting outwardly at least to said teeth of said ratchet toothing member.

14. The belt retractor according to claim 13, wherein said axial projections are circumscribed into a circular outer contour of said belt coiling shaft.

15. The belt retractor according to claim 14, wherein each locking pawl has a rear face opposite to its engagement face and each axial projection has an adjacent stop face whereon said rear face abuts under a substantial locking load of said locking pawls.

16. The belt retractor according to claim 13, wherein said locking pawls have an outer contour which, in said rest position, is circumscribed into a circular outer contour of said belt coiling shaft.

17. The belt retractor according to claim 10, wherein said belt coiling shaft is mounted at each of its axial ends in a low friction bearing which yields radially under a substantial locking load transmitted by said belt coiling shaft.

18. The belt retractor according to claim 17, wherein said retractor has a cover on one of its sides accommodating at least said vehicle-sensitive sensor and said pilot wheel, said cover having a bearing bushing radially yieldably mounted in said cover, one end of said belt coiling shaft being rotatably mounted in said bearing bushing.

19. The belt retractor according to claim 18, wherein said bearing bushing is mounted in said cover via an annular bead structure concentrically surrounding said bushing.

20. The belt retractor according to claim 17, wherein said retractor has a cover on one of its sides and accommodating a belt coiling spring, said cover carrying a bearing bushing for rotatably supporting an axial end of said belt coiling shaft, and said cover being radially displaceably mounted on a side wall of a retractor housing.

21. The belt retractor according to claim 20, wherein said cover has integral resiliently deflectable, and axial inwardly extending leg portions, each leg portion having a free end engaged in an opening of said housing side wall.

* * * * *